(12) United States Patent
Weldon et al.

(10) Patent No.: US 10,716,404 B1
(45) Date of Patent: Jul. 21, 2020

(54) CONVERTIBLE BEACH CHAIR AND TRANSPORT DEVICE

(71) Applicants: Julie Weldon, Mt. Pleasant, SC (US); Stacey Pierce, Mt. Pleasant, SC (US); Robert Evans, Greer, SC (US); Lynn Weirick, Greenville, SC (US); Jaclyn Lynch, Greenville, SC (US); Shawn Quinn, Waterford, MI (US); Alex Grube, Roseville, MI (US)

(72) Inventors: Julie Weldon, Mt. Pleasant, SC (US); Stacey Pierce, Mt. Pleasant, SC (US); Robert Evans, Greer, SC (US); Lynn Weirick, Greenville, SC (US); Jaclyn Lynch, Greenville, SC (US); Shawn Quinn, Waterford, MI (US); Alex Grube, Roseville, MI (US)

(73) Assignee: OME Gear Co., Mt. Pleasant, SC (US)

( * ) Notice: Subject to any disclaimer, the term of this patent is extended or adjusted under 35 U.S.C. 154(b) by 0 days.

(21) Appl. No.: 16/020,311

(22) Filed: Jun. 27, 2018

(51) Int. Cl.
*A47C 13/00* (2006.01)
*B62B 1/02* (2006.01)
(Continued)

(52) U.S. Cl.
CPC ............... *A47C 13/00* (2013.01); *A47C 1/14* (2013.01); *A47C 4/04* (2013.01); *A47C 4/28* (2013.01);
(Continued)

(58) Field of Classification Search
CPC ........... A47C 13/00; A47C 1/14; A47C 1/143; A47C 4/04; A47C 4/08; A47C 4/28;
(Continued)

(56) References Cited

U.S. PATENT DOCUMENTS

| 2,806,708 A | 9/1957 | Finstad | B62B 1/12 280/47.27 |
| 4,105,242 A | 8/1978 | Terbeek | A61G 1/0562 280/30 |

(Continued)

FOREIGN PATENT DOCUMENTS

| CN | 204500048 U | 7/2015 |
| CN | 206238857 U | 6/2017 |

(Continued)

OTHER PUBLICATIONS

International Search Report, International Application No. PCT/US2019/039316, dated Oct. 17, 2019. ISA/RU, Moscow, Russia.

(Continued)

*Primary Examiner* — John D Walters
(74) *Attorney, Agent, or Firm* — Gregory Finch; Finch Paolino, LLC (57) ABSTRACT

A wheeled device that converts between a multi-mode beach chair and a standard vertical dolly. It can also be used as a flat 2-wheeled wagon. A rigid frame includes at least two parts coupled by hinges, a first part (long part) that can fold to different lengths, and a second part (short part). There is a swiveling top handle on the end of the long part, and a swiveling bottom handle on the end of the short part. In a long chair mode, the long part is fully extended; in the short chair mode, it is folded and In the dolly mode, the short part forms the bottom of the dolly.

8 Claims, 6 Drawing Sheets

(51) Int. Cl.
   *A47C 4/04* (2006.01)
   *A47C 7/00* (2006.01)
   *B62B 5/06* (2006.01)
   *A47C 4/28* (2006.01)
   *B62B 1/00* (2006.01)
   *B62B 1/04* (2006.01)
   *A47C 1/14* (2006.01)

(52) U.S. Cl.
   CPC .............. *A47C 7/006* (2013.01); *B62B 1/008* (2013.01); *B62B 1/042* (2013.01); *B62B 5/06* (2013.01)

(58) Field of Classification Search
   CPC ......... A47C 7/006; A47C 7/008; B62B 1/008; B62B 1/10; B62B 1/12; B62B 1/042; B62B 1/04; B62B 5/06
   USPC ....................................................... 280/47.18
   See application file for complete search history.

(56) References Cited

U.S. PATENT DOCUMENTS

| | | | | |
|---|---|---|---|---|
| 4,376,547 | A | 3/1983 | Dominko | A47C 1/143 280/30 |
| 4,733,905 | A | 3/1988 | Buickerood | A47C 13/00 280/47.25 |
| 5,056,804 | A | 10/1991 | Wilson | B62B 1/12 280/30 |
| 5,062,650 | A | 11/1991 | Chang | A47C 13/00 280/30 |
| 5,356,197 | A | 10/1994 | Simic | A47C 13/00 280/204 |
| 5,423,592 | A * | 6/1995 | Spurrier | A47C 1/143 297/129 |
| 5,542,740 | A | 8/1996 | Chang | A47C 13/00 280/30 |
| D394,356 | S | 5/1998 | Chen | D34/24 |
| 5,971,483 | A | 10/1999 | Brenneman | A47C 13/00 280/47.4 |
| 6,131,925 | A * | 10/2000 | Weldon | B62B 1/12 280/30 |
| 6,375,200 | B1 | 4/2002 | Harter | A01M 31/00 280/30 |
| 6,877,586 | B2 | 4/2005 | Babkes | B62B 1/002 182/129 |
| 7,316,407 | B1 | 1/2008 | Elden | B62B 1/12 280/124.12 |
| 7,963,531 | B2 | 6/2011 | Panigot | A47C 1/143 280/38 |
| 8,366,124 | B1 | 2/2013 | Caldwell | B62B 1/20 280/30 |
| 8,505,959 | B2 | 8/2013 | Darling, III | A61G 1/013 280/640 |
| 8,585,135 | B2 | 11/2013 | Wilson | A47C 1/024 297/354.12 |
| 8,608,188 | B2 * | 12/2013 | Goldszer | B62B 1/008 280/651 |
| 8,814,181 | B1 | 8/2014 | Weldon et al. | |
| 8,967,651 | B1 | 3/2015 | Simic | B62K 27/003 280/204 |
| 9,598,095 | B2 * | 3/2017 | Panigot | B62B 1/12 |
| 2002/0088829 | A1* | 7/2002 | Hsu | A45C 9/00 224/153 |
| 2013/0328279 | A1 | 12/2013 | Feick | B62B 3/00 280/47.18 |
| 2018/0000252 | A1 | 1/2018 | Weldon et al. | |

FOREIGN PATENT DOCUMENTS

| | | | |
|---|---|---|---|
| EP | 0997090 A1 | 5/2000 | |
| FR | 2612754 A1 | 9/1988 | |
| FR | 3021853 B1 | 5/2017 | ............ A47C 1/143 |
| GB | 2217984 A | 11/1989 | ............ A47C 1/143 |

OTHER PUBLICATIONS

Written Opinion of the International Searching Authority. International Application No. PCT/US2019/039316, dated Oct. 17, 2019. ISA/RU, Moscow, Russia.

* cited by examiner

CONVERTIBLE BEACH CHAIR AND TRANSPORT DEVICE

BACKGROUND

Field of the Invention

The present invention relates generally to wheeled devices that convert from one mode to another and more particularly to a convertible chair, cart and transport device.

Description of the Prior Art

Chairs with wheels are known in the art as are push dollies and flat wagon type carts. Weldon in U.S. Pat. No. 6,131,925 teaches a beach chair that folds up into a cart designed to carry beach equipment. Weldon et al. in U.S. Pat. No. 8,814,181 teach a base with wheels that accepts a foldable beach chair. While these devices are useful, they do not serve the three-fold purpose of acting as a multi-configured wheeled chair, a dolly and a flat wagon cart.

In a companion patent application published as U.S. 2018/0000252, we teach a cart type convertible chair that resembles a commercial vertical dolly.

It would be advantageous to have a device that overcomes the shortcomings of the prior art foldable devices and provides all three modes of operation.

SUMMARY OF THE INVENTION

The present invention relates to a wheeled device that converts between a multi-mode beach chair and a standard vertical dolly. It can also be used as a flat 2-wheeled wagon. A rigid frame includes at least two parts coupled by hinges, a first part (long part) that can fold to different lengths, and a second part (short part). There is a swiveling top handle on the end of the long part, and a swiveling bottom handle on the end of the short part. In a long chair mode, the long part is fully extended; in the short chair mode, it is folded and In the dolly mode, the short part forms the bottom of the dolly.

The present invention, in addition to being a basic convertible device, can optionally be equipped with modern features such as a solar-powered USB port charger. The invention also allows for different accoutrements (or models) for specialized activities such as hunting, fishing, camping RV'ing, beach, outdoor sports, tailgating and the like. In the chair mode, the present invention can have multiple chair positions along with the ability to lie flat.

DESCRIPTION OF THE FIGURES

Attention is now directed to several figures that illustrate features of embodiments of the present invention:

FIG. 1A shows an embodiment with rotating hinges, while FIG. 1B shows an embodiment that telescopes.

Several drawings and illustrations have been presented to aid in understanding the present invention. The scope of the present invention is not limited to what is shown in the figures.

DESCRIPTION OF THE PREFERRED EMBODIMENTS

The present invention relates to a convertible device that can become a vertical dolly, a flat cart and a chair with different seat heights and lengths.

Figure 1A:
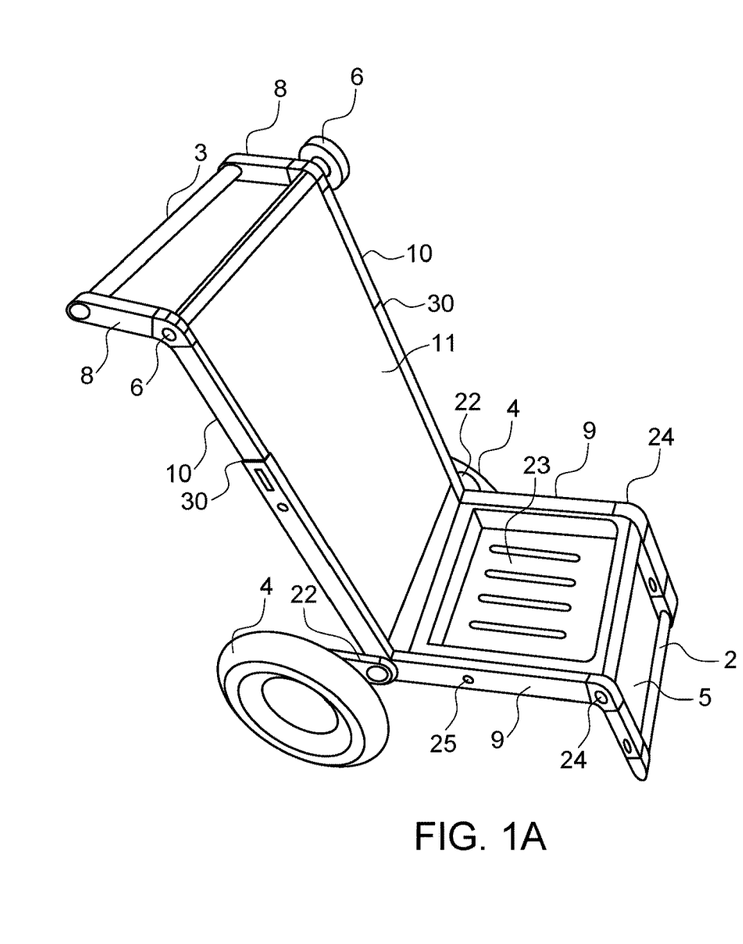
FIGS. 1A-1B show a perspective view of an embodiment of the present invention in the dolly mode.
Figure 1B:
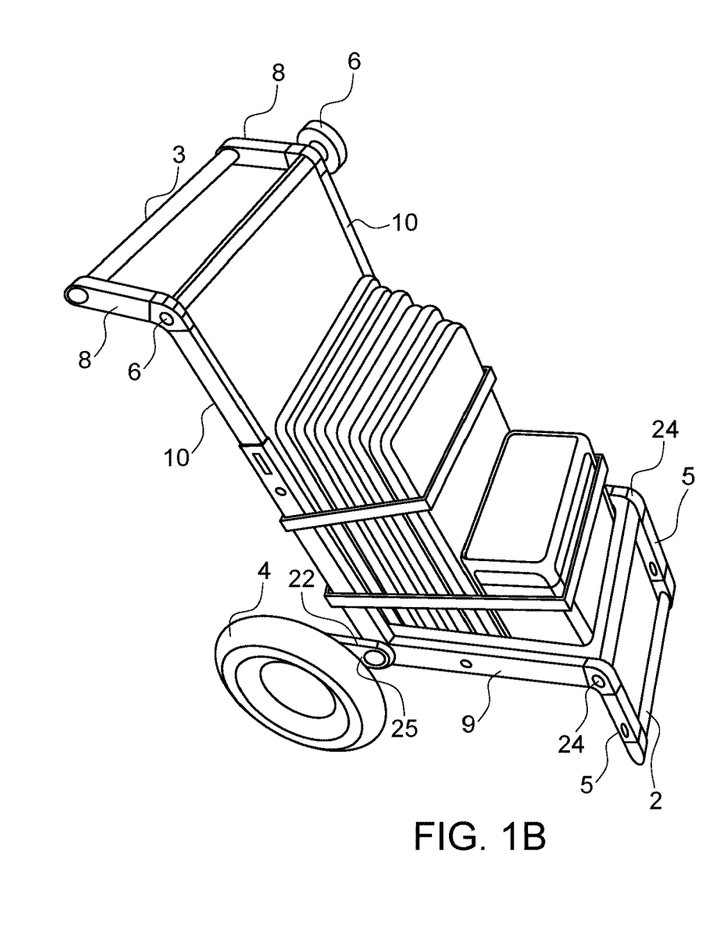
Figure 2:
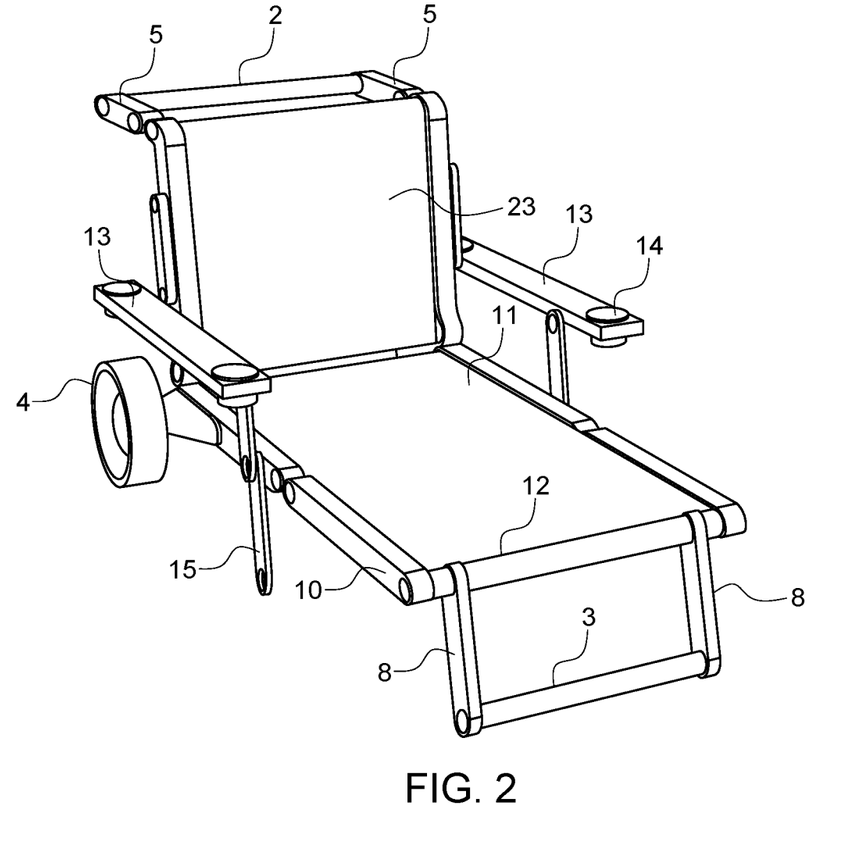
FIG. 2 shows the long flat chair mode.

The invention is equipped with at least two wheels 4 attached to an elongated frame 1 as shown in FIGS. 1A, 1B and 2. The frame 1 can preferably be made from aluminum for lightness and strength; however, any rigid material may be used. The long surface 11 on the frame 1 includes a canvas or other covering material. The frame 1 includes a short chair surface 23 and a long surface 11 formed of a telescoping pair of first bar members 910. There are two folding joints in the frame—a lower chair joint 24 and an upper handle joint 6. The lower chair joint 24 is connected to a rotating leg portion 5. The upper handle joint 6 is connected to a rotating handle portion 8 with handle 3.

FIGS. 1A-1B show what can be called the dolly mode of the device. The preferred width of the wheel base is around 31 inches with the preferred width of the main frame 1 being around 22-23 inches. While these are preferred sizes, any sizes are within the scope of the present invention. In the dolly mode, the bottom of the wheels 4 and the leg 2 are flush with the ground when the dolly is simply standing. The dolly can be leaned backward slightly to roll forward. Other features shown in FIGS. 1A-1B are the handle 3 that can pivot from the frame 10 on the joint 6. The device has a long surface 11 and a short surface 23.

The long surface 11 is supported by a pair of rigid first bar members 10 that fold around a central first pair of rotating hinges 30 in FIG. 1A and telescope in FIG. 1B forming a frame that is attached to a pair of non-folding second bar members 9 forming a secondary frame, and short surface 23. The folded length of first bar members 10 is approximately the same as the length of second bar members 9. The non-folded length of first bar members 10 is approximately twice the length of second bar members 9. The first bar members 10 and second bar members 9 are connected through a second pair of rotating hinges 22 so that they can be adjusted to different angles with respect to one-another including completely folding the two frames flat against each other for storage. The wheels 4 are also rigidly attached to the second pair of rotating hinges 22 by extension arms 25. The long and short surfaces 11 and 23, respectively, can be covered with a flexible material like canvas, or they can be made from slats or any other surface material.

The frame formed by the first bar members 10 connects to an approximately rectangular handle made from bars handle 3 and rotating handle portions 8 that can rotate about a upper handle joint 6 with respect to the first bar members 10. The secondary frame formed by the second bar members 9 connects to a second approximately rectangular handle or foot made from the rotating leg portions 5 and leg 2 that can rotate about lower chair joint 24.

FIG. 2 shows the long flat chair mode. The long surface 11 forms a continuous beach chair. The short surface 23 forms the back of the chair. What was the dolly leg 2 is now part of a handle along with its rotating leg portions 5. What was the dolly handle 3 is now a front leg that swivels around front bar 12. Two arms 13 run from the rear vertical frame forward, and are anchored by descending supports 15. The arms 13 can be optionally equipped with drink holders 14 which can also double as ash trays.

Figure 3:
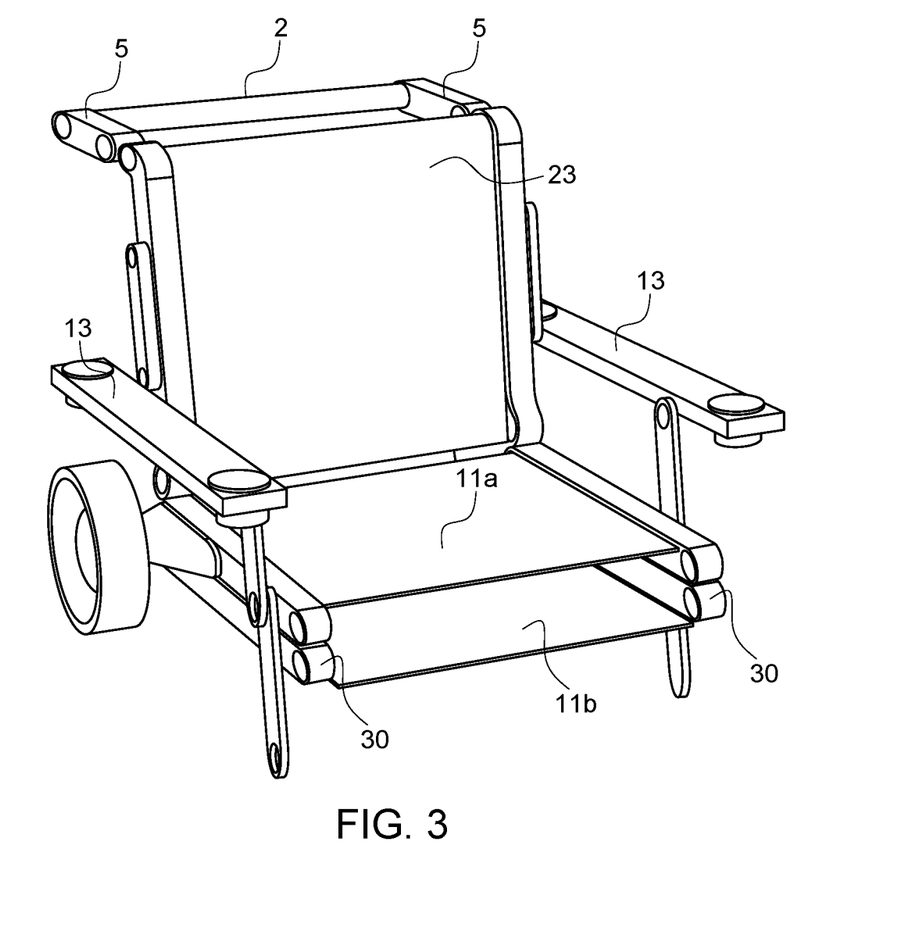
FIG. 3 shows the short flat chair mode by folding the front section under.

FIG. 3 shows the short flat chair mode. The long surface 11 is split into two parts 11a and 11b, with 11b folded under 11a. The first pair of frame members 10, in addition to telescoping, also rotate about a the central first pair of rotating hinges 30 to form the fold. The other features are the same as the long flat chair mode shown in FIG. 2.

Figure 4:
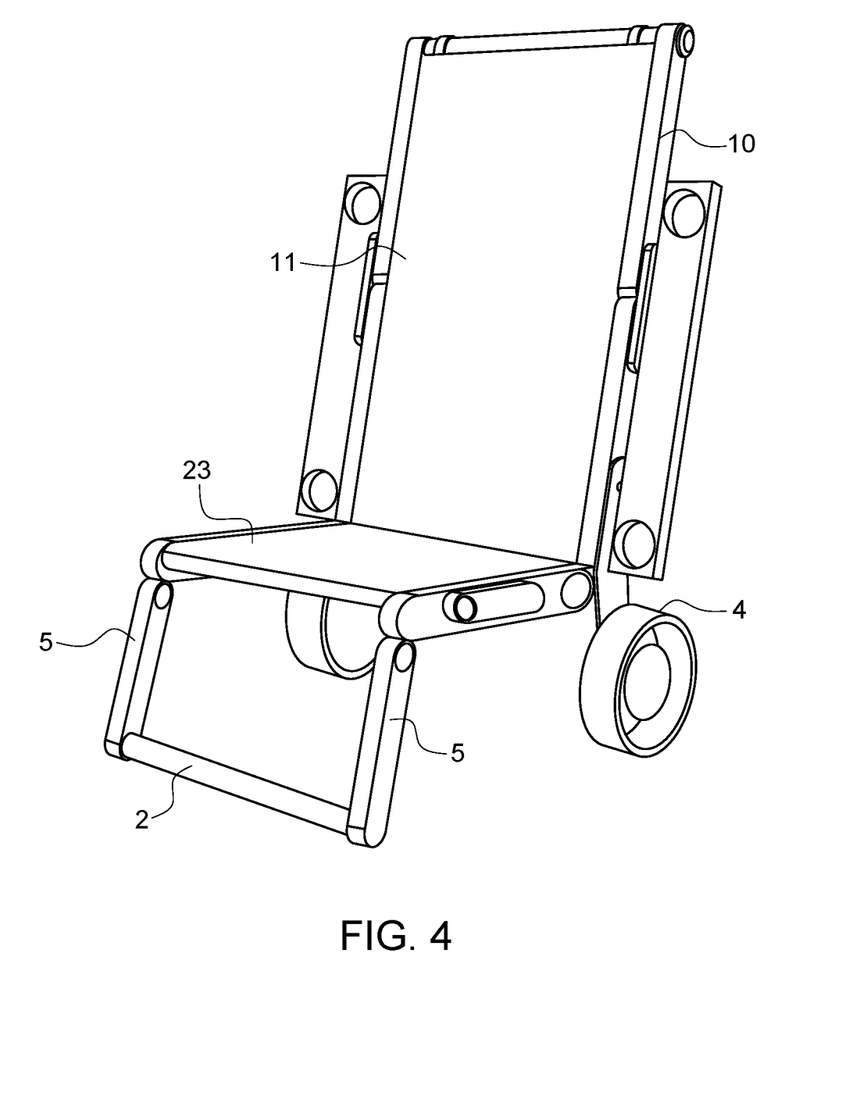
FIG. 4 shows the reverse mode, long-back chair.

FIG. 4 shows the reverse mode, long-back chair. Here, the device is flipped into what resembles dolly mode; however the seat formed by the short surface 23 is higher than the other chair mode, and the long surface 11 forms a long, tall back.

Figure 5:
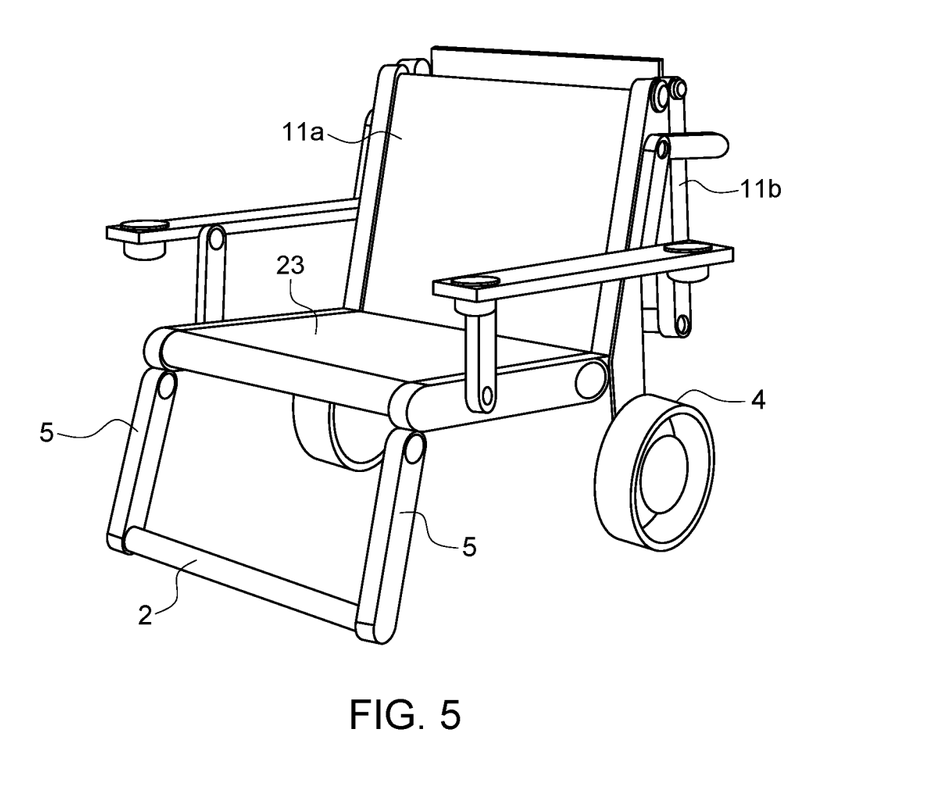
FIG. 5 shows the reverse mode, short back chair.

FIG. 5 shows the reverse mode, short-back chair mode, made from the long-back mode by simply folding the upper part 11b of the long surface 11 behind the chair leaving the part 11a as a short chair back.

Figure 6:
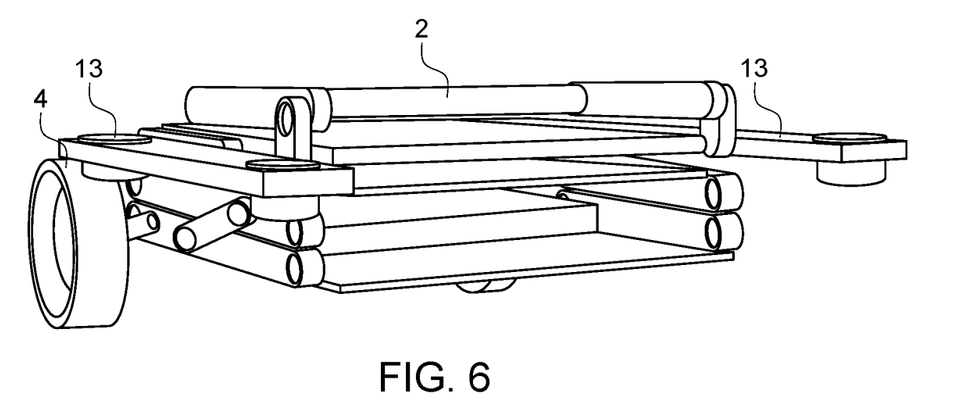
FIG. 6 shows the folded store-away mode.

FIG. 6 shows an embodiment n of the present invention folded for storage or transport. In this mode, the wheels 4 are optionally removable for convenience. Some embodiments have non-removable wheels. Also, in some embodiments, the arms 13 are also removable.

Numerous accessories may be used with the present invention. They can include, but are not limited to, the solar-powered USB charger previously discussed; fishing rod holders; large bungee straps to hold everything on cart; wagon sides; hooks on back of chair to hang or hold towels/hats/etc.; storage compartment or compartments; shade canopy; umbrella holder; removable seat cushions; and an extension at seat base (leg support) to convert chair to a lounger.

In summary, the device has a rigid base frame that includes two equal length, folding, approximately parallel first bar members 10, having a central first pair of rotatable hinges 30 allowing a folded configuration and an un-folded configuration, where the distance between the first pair of bar members 10 in the folded configuration is approximately equal to their folded length, and where the unfolded length is approximately double the folded length, the first bar members each have a distal end and a proximal end.

The device also has a rigid secondary frame also having a proximal and distal end that includes two equal length and parallel second bar members 9 of length approximately equal to the folded length of the first bar members 10 rotatably attached to the distal ends of the first bar members 9 through a second pair of rotating hinges 22 at the proximal end of the second bar members 10. In addition, the device has a pair of wheels 4 rotatably mounted to extension arms 25 that are rigidly attached to the second pair of rotatable hinges 22 left and right.

The device has a dolly mode, a long flat chair mode, a short flat chair mode, a reversed tall back chair mode, a reversed short back chair mode, and a folded mode. In the dolly mode, the first bar members are in the un-folded mode forming a vertical back for the device; the second bar members are approximately perpendicular to the first bar members, and the second handle forms a lower foot for the device. In the long flat chair mode, the first and second bar members are configured as in the dolly mode, and the second bar members for a back for the device, while the first handle forms a lower foot for the device. In the short flat chair mode, the first bar members are in a folded configuration, the second bar members are approximately perpendicular to the first bar members; the second bar members form a back for the device, and a pair of descending legs (15) form a lower foot for the device. In the reversed tall back chair mode, the first bar members and the second bar members are configured as in the dolly mode with the first bar members forming a long chair back for the device and the second handle forming a lower foot for the device. In the reversed short back chair mode, the first bar members are in the folded configuration forming a short chair back for the device, and the second bar members and second handle are configured as in the tall back chair mode. In the folded mode, the first bar members are in the folded configuration, the second bar members are approximately parallel to the first bars, and the first and second handles are folded and also approximately parallel to the first bar members.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A folding combination wheeled device comprising:
a rigid base frame comprised of a pair of substantially parallel first bar members each having a distal end and a proximal end, the first bar members being foldable around a central first pair of rotatable hinges so as to provide a folded configuration and an unfolded configuration of the base frame, wherein a distance between the first bar members in the folded configuration is approximately equal to a folded length of the first bar members in the folded configuration, and an unfolded length of the first bar members is approximately double the folded length;
a rigid secondary frame comprised of a pair of substantially parallel second bar members each having a distal end and a proximal end, the second bar members having a length approximately equal to the folded length of the first bar members and being rotatably attached to the distal ends of the first bar members through a second pair of rotating hinges at the proximal end of the second bar members;
a first approximately rectangular handle attached to the proximal end of the first bar members and rotatable around an upper handle joint with respect to the first bar members;
a second approximately rectangular handle attached to the distal end of the second bar members and rotatable around a lower chair joint with respect to the second bar members; and
a pair of wheels respectively rotatably mounted to a pair of extension arms that are rigidly attached to each of the second pair of rotatable hinges;
the device having a dolly mode, a long flat chair mode, a short flat chair mode, a reversed tall back chair mode, a reversed short back chair mode, and a folded mode;
wherein, in the dolly mode: the first bar members are in the un-folded configuration forming a vertical back for the device; the second bar members are approximately perpendicular to the first bar members; and the second handle forms a lower foot for the device;
wherein, in the long flat chair mode: the first and second bar members are configured as in the dolly mode, with the second bar members forming a back for the device while the first handle forms a lower foot for the device;
wherein, in the short flat chair mode: the first bar members are in a folded configuration; the second bar members are approximately perpendicular to the first bar members; the second bar members form a back for the device; and a pair of descending legs form a lower foot for the device;
wherein, in the reversed tall back chair mode: the first bar members and the second bar members are configured as in the dolly mode, with the first bar members forming a long chair back for the device, and the second handle forming a lower foot for the device;

wherein, in the reversed short back chair mode: the first bar members are in the folded configuration forming a short chair back for the device; and the second bar members and second handle are configured as in the tall back chair mode; and wherein, in the folded mode: the first bar members are in the folded configuration; the second bar members are approximately parallel to the first bar members; and the first and second handles are folded and also approximately parallel to the first bar members.

2. The folding combination wheeled device of claim 1 further comprising a pair of flat arms attached to the second bar members.

3. The folding combination wheeled device of claim 2 wherein the pair of flat arms have drinking cup holders.

4. The folding combination wheeled device of claim 1 further comprising a canvas back attached between the first bar members.

5. The folding combination wheeled device of claim 1 further comprising a canvas back attached between the second bar members.

6. A folding combination wheeled device comprising:

a rigid base frame comprised of a pair of equal length and substantially parallel first bar members each having a distal end and a proximal end, the first bar members being foldable around a central first pair of rotatable hinges so as to provide a folded configuration and an un-folded configuration of the base frame, wherein a distance between the first bar members in the folded configuration is approximately equal to a folded length of the first bar members in the folded configuration, and an unfolded length of the first bar members is approximately double the folded length;

a rigid secondary frame comprised of a pair of equal length and substantially parallel second bar members each also having a distal end and a proximal end, the second bar members having a length approximately equal to the folded length of the first bar members and being rotatably attached to the distal ends of the first bar members through a second pair of rotating hinges at the proximal end of the second bar members;

a first approximately rectangular handle attached to the proximal end of the first bar members and rotatable around an upper handle joint;

a second approximately rectangular handle attached to the distal end of the second bar members and rotatable around a lower chair joint;

a pair of wheels respectively rotatably mounted to a pair of extension arms that are rigidly attached to each of the second pair of rotatable hinges;

the folding combination wheeled device having at least a long flat chair mode and a short flat chair mode, wherein, in the long flat chair mode: the first and second bar members are configured such that the second bar members form a back of the device while the first handle forms a lower foot for the device.

7. The folding combination wheeled device of claim 6 wherein, in the short flat chair mode: the first bar members are in a folded configuration; the second bar members are approximately perpendicular to the first bar members; the second bar members form the back of the device; and a pair of descending legs form a lower foot for the device.

8. The folding combination wheeled device of claim 6 further having a dolly mode wherein, in the dolly mode: the first bar members are in the un-folded configuration, forming the back of the device; the second bar members are approximately perpendicular to the first bar members; and the second handle forms a lower foot for the device.

* * * * *